(12) United States Patent
Sigg et al.

(10) Patent No.: US 9,307,032 B1
(45) Date of Patent: Apr. 5, 2016

(54) MEDIA SESSION EXTENSION IN A WIRELESS NETWORK

(71) Applicant: Sprint Communications Company L.P., Overland Park, KS (US)

(72) Inventors: Jason Peter Sigg, Overland Park, KS (US); Sandeep Goyal, Overland Park, KS (US); Nithin Kumar Gunuganti, Overland Park, KS (US); Daniel C. Jensen, Parkville, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 244 days.

(21) Appl. No.: 14/037,840

(22) Filed: Sep. 26, 2013

(51) Int. Cl.
  *G06F 15/16* (2006.01)
  *H04L 29/08* (2006.01)
(52) U.S. Cl.
  CPC .................................... *H04L 67/145* (2013.01)
(58) Field of Classification Search
  CPC ...... H04W 76/02; H04W 76/04; H04W 76/06
  USPC ................................................. 709/203, 227
  See application file for complete search history.

(56) References Cited

U.S. PATENT DOCUMENTS

| | | | | |
|---|---|---|---|---|
| 8,588,697 B1 * | 11/2013 | Vargantwar | ......... | H04W 76/068 455/450 |
| 8,667,513 B1 * | 3/2014 | Shah | ................. | H04W 52/0206 719/328 |
| 8,830,848 B1 * | 9/2014 | Shetty | ................. | H04W 68/005 370/252 |
| 2004/0174866 A1 * | 9/2004 | Matsuda | ................. | H04L 12/12 370/352 |
| 2013/0208638 A1 * | 8/2013 | Hsu et al. | ...................... | 370/311 |

* cited by examiner

Primary Examiner — Duyen Doan

(57) ABSTRACT

A wireless access node and media session extension method configured to extend a media session in a wireless network are provided. The wireless access node in one example embodiment includes a communication interface configured to exchange wireless communications with a user equipment (UE), a storage system configured to store a UE fail state corresponding to the UE of a current media session and store an extended dormancy time period, and a processing system coupled to the communication interface and to the storage system, with the processing system configured to obtain the UE fail state, if the UE fail state is true, then load the extended dormancy time period into a dormancy timer corresponding to the UE, and if the dormancy timer expires, then maintain one or both of a traffic channel and a signaling channel between the wireless access node and the UE.

17 Claims, 6 Drawing Sheets

MEDIA SESSION EXTENSION IN A WIRELESS NETWORK

TECHNICAL FIELD

Aspects of the disclosure are related to the field of wireless communications, and in particular, to media session extension in a wireless network.

TECHNICAL BACKGROUND

Wireless communication systems can be used to exchange voice and data communications, including text, images, and video, for example. Data communications are typically packetized and do not receive a dedicated channel or link. A media session comprising packets can continue for as long as packets are exchanged.

A media session can be initiated by either a wireless network or by a wireless-capable device that is attempting to establish communications with the wireless network. The media session is initiated by an exchange of signaling over a signaling (or paging) channel. Once the media session is achieved, the media session is maintained as long as communications are exchanged.

A media session will automatically terminate when packets have not been exchanged over a predetermined time-out period, typically referred to as a dormancy period. If the media session is dropped, the signaling will have to be successfully re-performed and a new session will have to be established in order for the wireless network and the wireless device to continue exchanging packets. However, if the wireless device presents a difficulty in establishing an original connection, there is a strong likelihood that re-establishing the media session will also be difficult.

OVERVIEW

Systems and methods for extending a media session in a wireless network are provided herein. In one example, a wireless access node and media session extension method configured to extend a media session in a wireless network includes a communication interface configured to exchange wireless communications with a user equipment (UE), a storage system configured to store a UE fail state corresponding to the UE of a current media session and store an extended dormancy time period, and a processing system coupled to the communication interface and to the storage system, with the processing system configured to obtain the UE fail state, if the UE fail state is true, then load the extended dormancy time period into a dormancy timer corresponding to the UE, and if the dormancy timer expires, then maintain one or both of a traffic channel and a signaling channel between the wireless access node and the UE.

In an example of a media session extension method in a wireless access node of a wireless network, the method includes, in the wireless access node, obtaining a UE fail state corresponding to a user equipment (UE) of a current media session, in the wireless access node, if the UE fail state is true, then loading an extended dormancy time period into a dormancy timer corresponding to the UE, and in the wireless access node, if the dormancy timer expires, then maintaining one or both of a traffic channel and a signaling channel between the wireless access node and the UE.

In another example of a media session extension method in a wireless access node of a wireless network, the method includes, in the wireless access node, obtaining a UE fail state corresponding to a user equipment (UE) of a current media session, in the wireless access node, if the UE fail state is true and if the UE is within a UE top two locations, then loading an extended dormancy time period into a dormancy timer corresponding to the UE, and in the wireless access node, if the dormancy timer expires, then maintaining one or both of a traffic channel and a signaling channel between the wireless access node and the UE.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
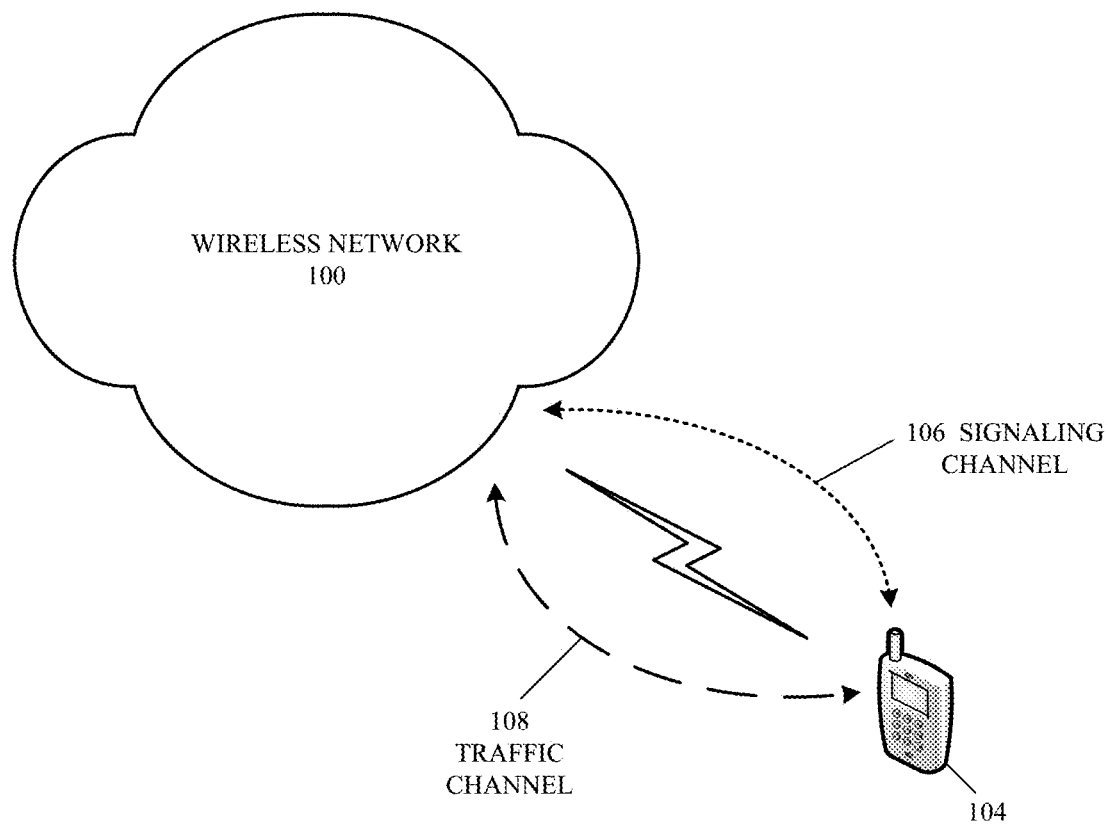
FIG. 1 shows a wireless network communicating with a wireless user equipment (UE).

FIG. 1 shows a wireless network 100 communicating with a wireless user equipment (UE) 104. Either of the wireless network 100 or the UE 104 can initiate the communications and cause a media session to be established. As part of establishing communications, either the wireless network 100 or the UE 104 sends a connection request via a signaling (or paging) channel 106. If and when the media session setup is complete, the wireless network 100 establishes a traffic channel 108 between the wireless network 100 and the UE 104. If should be understood that multiple UEs 104 may be in communication with the wireless network 100, but only one UE 104 is shown for clarity.

A media session may not be established on a first connection request. Multiple connection requests may be sent before the media session is established. If conditions are especially poor, the connection attempt may not be successful, even if repeatedly tried.

If the media session comprises a data communication, there may not be an explicit termination of communications. For example, if the media session comprises packet communications, such as where the user of the UE 104 is browsing the world-wide web or is sending or receiving text messages, for example, the media session may terminate after a period of inactivity. This time period is controlled by a dormancy timer in the wireless network 100. The dormancy timer will be refreshed upon any communications between the wireless network 100 and the UE 104, whether on a forward traffic link (i.e., from the wireless network 100 to the 104), or on a reverse traffic link (i.e., from the UE 104 to the wireless network 100). As long as the wireless network 100 and the UE 104 periodically exchange communications, the dormancy timer will be refreshed and the media session will remain in existence. As a result, both the signaling channel 106 and the traffic channel 108 will remain active between the wireless network 100 and the UE 104.

While communications are exchanged, the dormancy timer will continue to be refreshed and will not run down and expire. If communications are idle for a time period longer than the dormancy time period, the dormancy timer will expire. When the dormancy timer expires, i.e., no communications have been exchanged between the wireless network 100 and the UE 104 during a dormancy time period, then the media session can be at least partially de-activated or dropped. Both the signaling channel 106 and the traffic channel 108 can be dropped. Therefore, the timeout may include dropping only the traffic channel 108 in some examples. The time-out action may further include maintaining at least some of the UE information in the wireless access node 200, wherein the UE information can be used to more quickly re-establish a media session at a later time. However, it may not be desirable to drop both the signaling channel 106 and the traffic channel 108, such as where establishing the media session was difficult.

Even if the wireless network 100 and the UE 104 did not explicitly terminate the media session, such as where the media session terminated due to a pause in browsing, for example, the media session will have to be re-established. Either of the wireless network 100 or the UE 104 will have to send a new connection request in order to re-establish the connection and the media session.

If the first connection attempt was problematic, then re-establishing the media session may likewise be difficult. Problems in establishing a media session may be encountered due to interference from other sources of RF or sources of electromagnetic noise, due to blocking by buildings, terrain, or weather conditions, or other environmental conditions. Therefore, once a media session is established for a UE that has had difficulty in establishing communications, it would be advantageous to extend and not de-establish a media session for a UE known to have a history of connection trouble.

Figure 2:
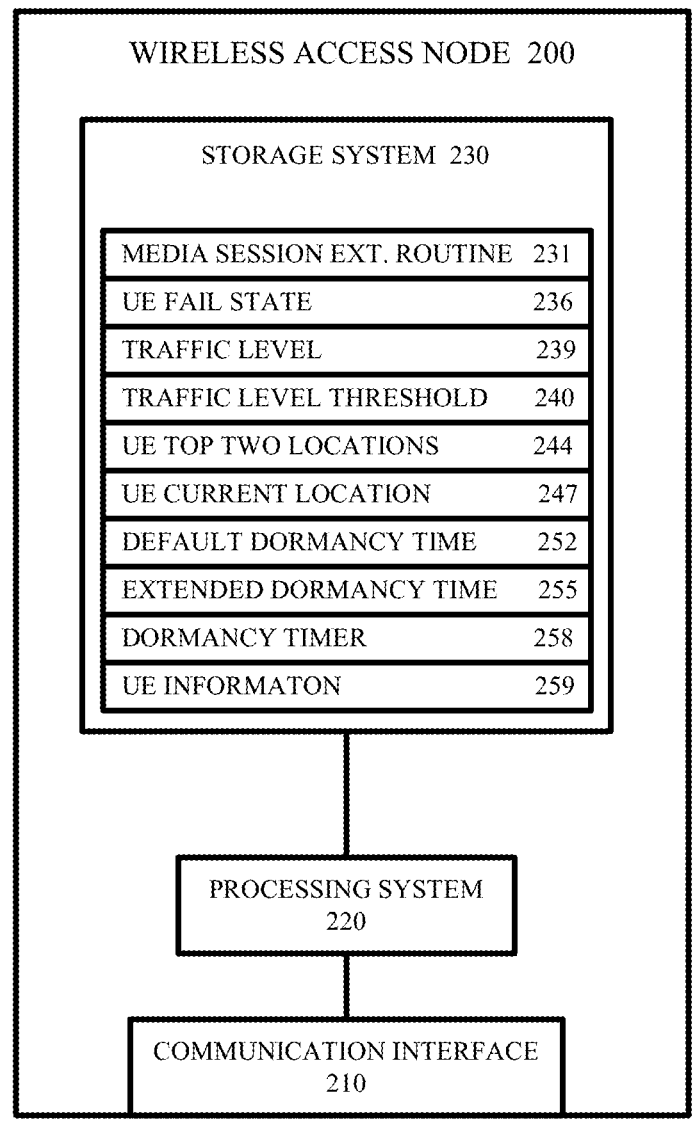
FIG. 2 shows an exemplary wireless access node of the wireless network.

FIG. 2 shows an exemplary wireless access node 200 of the wireless network 100. The wireless access node 200 in the example shown includes a communication interface 210, a storage system 2130, and a processing system 220. The processing system 220 is coupled to the communication interface 210 and to the storage system 230.

The communication interface 210 is configured to exchange communications with other components or devices of the wireless network 100. The communication interface 210 can exchange communications with other components or devices of the wireless network 100 via wired or wireless links or channels.

The communication interface 210 is configured to exchange wireless communications with the UE 104. Further, the wireless access node 200 is configured to exchange signaling with the UE 104, such as for setting up and maintaining a media session with the UE 104.

The storage system 230 is configured to store executable routines, operational data, and communication data exchanged with various external devices, for example. In the example shown, the storage system 230 stores a media session extension routine 231, a UE fail state 236, a traffic level 239, a traffic level threshold 240, a UE top two locations 244, a UE current location 247, a default dormancy time period 252, an extended dormancy time period 255, a dormancy timer 258, and a UE information 259.

The media session extension routine 231 comprises a software routine that performs a media session extension. The media session extension routine 231 configures the wireless access node 200 and determines how the dormancy timer 258 is loaded. The media session extension routine 231 loads the dormancy timer 258 with either the default dormancy time period 252 or the extended dormancy time period 255. The media session extension routine 231 loads the dormancy timer 258 with the extended dormancy time period 255 when predetermined conditions have been met.

The UE fail state 236 comprises a fail state for a UE 104, wherein the wireless access node 200 currently is conducting a media session with the UE 104 and/or has conducted a media session with the UE 104 in the past. It should be understood that the wireless access node 200 may store a UE fail state 236 for each UE conducting a media session with the wireless access node 200. The UE fail state 236 comprises at least a fail true state or a fail not true state. The UE fail state 236 may be set to true if the UE has previously suffered connection difficulties. The UE fail state may be set to true if the UE 104 has suffered at least a predetermined minimum number of failures. The UE fail state 236 may be set to true if the UE 104 has suffered connection failures within a predetermined past time period. The UE fail state may be set to true if the UE 104 has suffered at least a predetermined minimum number of failures and the connection failures occurred within a predetermined past time period.

The traffic level 239 comprises a traffic level of the wireless network 100. The traffic level 239 can indicate whether the traffic is heavy or light, for example. The traffic level 239 can be used by the wireless access node 200 to determine if there is enough capacity available to leave one or both of the signaling channel 106 and the traffic channel 108 active.

The traffic level 239 can quantify traffic of the wireless network 100 as a whole, can quantify a traffic level specifically of the wireless access node 200, can quantify a traffic level in the traffic channel 108 of the wireless access node 200, can quantify a traffic level in the signaling channel 106 of the wireless access node 200, or can comprise historical traffic level, such as an expected traffic level for a current time of day, for example. It should be understood that the traffic level 239 can comprise any other suitable information that can be used to determine if the wireless access node 200 can leave one or both of the signaling channel 106 and the traffic channel 108 established for the media session. The traffic level 239 can include signaling channel traffic information and traffic channel traffic information in some examples.

The traffic level threshold 240 comprises a predetermined threshold below which traffic is not considered to be excessive and one or both of the signaling channel 106 and the traffic channel 108 can be maintained between the wireless access node 200 and the UE 104. Conversely, if the traffic level 239 is greater than the traffic level threshold 240, then the traffic is excessive and one or both of the signaling channel 106 and the traffic channel 108 may be dropped by the wireless access node 200.

In some examples, the processing system 220 compares the traffic level 239 to the traffic level threshold 240, maintains one or both of the signaling channel 106 and the traffic channel 108 if the traffic level 239 does not exceed the traffic level threshold 240, and drops one or both of the signaling channel 106 and the traffic channel 108 if the traffic level 239 exceeds the traffic level threshold 240. Alternatively, where the traffic level 239 includes both signaling channel traffic information and traffic channel traffic information, the signaling channel 106 can be maintained or dropped based on the signaling channel traffic information and the traffic channel 108 can be maintained or dropped based on the traffic channel traffic information.

The UE top two locations 244 comprise the two geographic locations where the UE 104 is most often found. The UE top two locations 244 can be compiled or accumulated by the wireless access node 200 or may be accessed or obtained by the wireless access node 200. In examples where the signaling channel 106 or the traffic channel 108 are left established, the wireless access node 200 can leave the channels established only for the UE top two locations (i.e., in the two locations where the UE 104 is most likely to be found).

The UE current location 247 comprises a current geographic location of the UE 104. The UE current location 247 may be generated by the wireless access node 200 or may be access or obtained by the wireless access node 200, typically from the UE 104. The UE current location 247 can be compared to the UE top two locations 244 to determine if the UE 104 is at one of the two most common UE locations as given in the UE top two locations 244.

The default dormancy time period 252 comprises a dormancy timer value that is normally used in the dormancy timer 258. Absent any history of connection problems, the wireless access node 200 will load the default dormancy time period 252 into the dormancy timer 258.

The extended dormancy time period 255 comprises a dormancy timer value greater in length than the default dormancy time period 252. The extended dormancy time period 255 can comprise a much longer time period than the default dormancy time period 252. Consequently, when using the extended dormancy time period 255, the wireless access node 200 will not terminate the media session with the UE 104 as quickly as when using the default dormancy time period 252.

The dormancy timer 258 comprises a timer used to determine dormancy in a media session. The media session is not determined to be dormant as long as the dormancy timer 258 has not expired.

The media session extension routine 231 comprises operating instructions that configure the processing system 220 when the media session extension routine 231 is executed by the processing system 220. In one example, the media session extension routine 231, when executed by the processing system 220, may direct the wireless access node 200 or the processing system 220 to obtain a UE fail state corresponding to a UE of a current media session, if the UE fail state is true, then load an extended dormancy time period into a dormancy timer corresponding to the UE, and if the dormancy timer expires, then maintain one or both of a traffic channel and a signaling channel between the wireless access node and the UE.

In another example, the media session extension routine 231, when executed by the processing system 220, may direct the wireless access node 200 or the processing system 220 to obtain a UE fail state corresponding to a UE of a current media session, if the UE fail state is true and if the UE is within a UE top two locations, then load an extended dormancy time period into a dormancy timer corresponding to the UE, and in the wireless access node, if the dormancy timer expires, then maintain one or both of a traffic channel and a signaling channel between the wireless access node and the UE.

As an alternative to maintaining one or both of the traffic channel 108 and the signaling channel 106, in other examples the wireless access node 200 will drop at least one of the traffic channel 108 and the signaling channel 106 or will drop the traffic channel 108 while maintaining the signaling channel 106, for example.

In addition, the wireless access node 200 can further store and maintain the UE information 259 after the dormancy timer expiration. The UE information 259 comprises information that can be used by the wireless access node 200 to more quickly re-establish a media session with the UE 104 at a later time.

Figure 3:
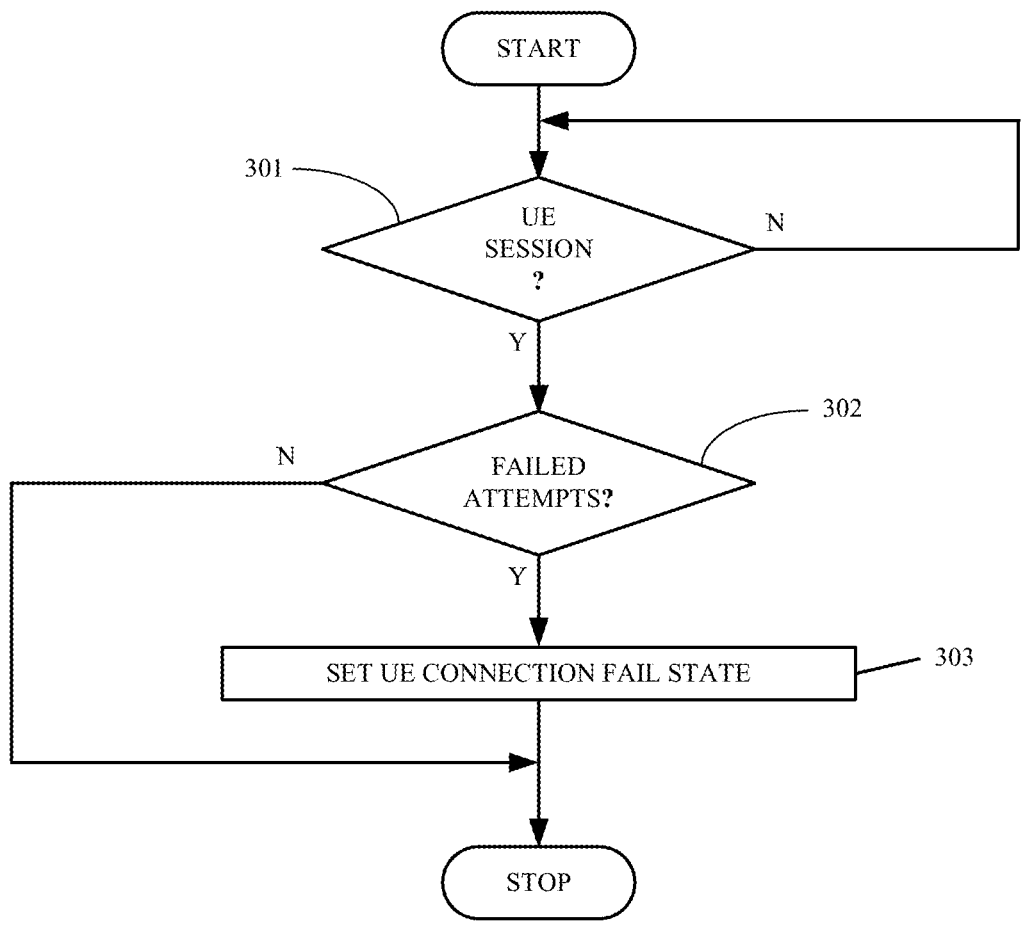
FIG. 3 is a flowchart of an exemplary dormancy timer configuration method.

FIG. 3 is a flowchart 300 of an exemplary dormancy timer configuration method. The method in the example shown comprises a method to be implemented in a wireless access node. In step 301, the method determines if a UE session has been successfully initiated in wireless access node. If a media session has been successfully initiated between the wireless access node and a UE, then the method proceeds to step 302. Otherwise, where a media session has not been successfully initiated with the UE, then the method loops back and waits for a media session to be successfully initiated.

In step 302, the method determines if previous failed attempts occurred for the UE. The determining includes determining if a number of past failed attempts exceeded a predetermined session attempts limit, in one example. In another example, the determining includes determining if the number of past failed attempts exceeded a predetermined session attempts limit within a predetermined session fail time period. If previous failed attempts occurred, then the method proceeds to step 303. Otherwise, where less than a predetermined session attempts limit number of past failed attempts occurred, or did not occur within the predetermined session fail time period, then the method branches around step 303 and step 303 is not performed.

Figure 4:
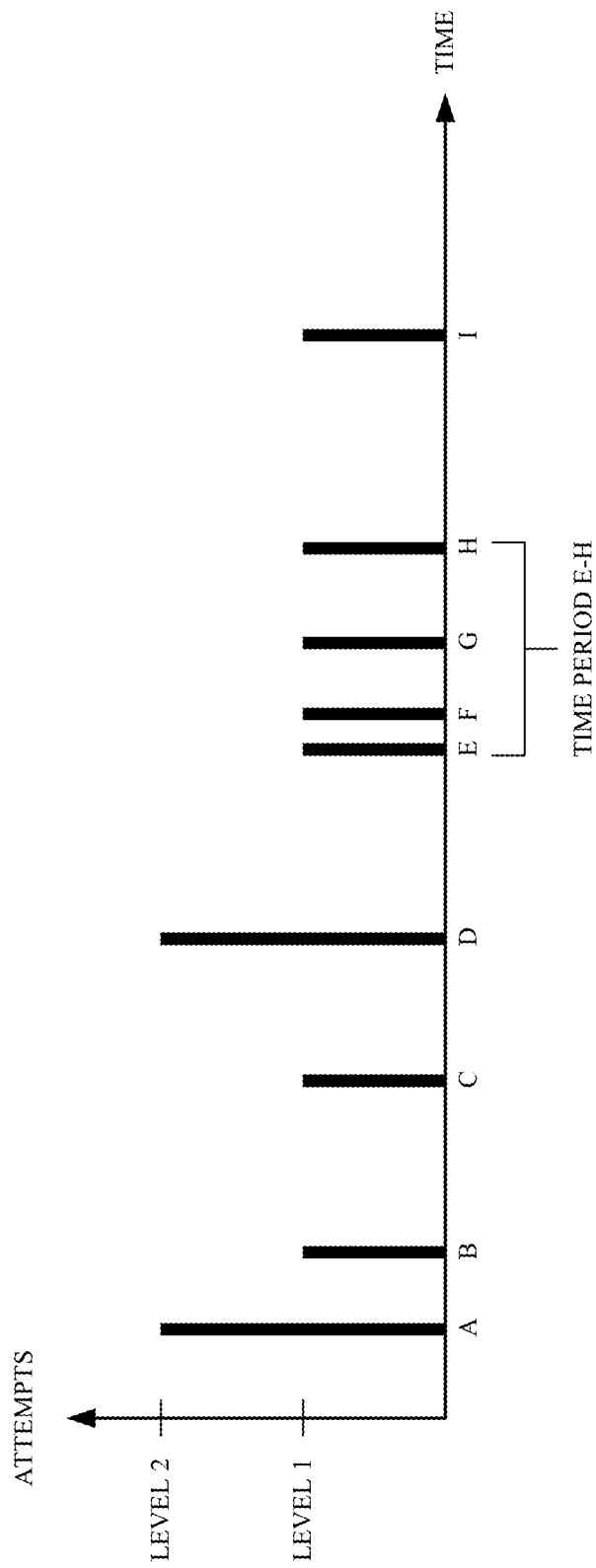
FIG. 4 shows a timeline illustrating how a media session failure can be determined.

FIG. 4 shows a timeline illustrating how a media session failure can be determined. The horizontal axis depicts time and the vertical axis depicts session initiation attempts. The session initiation attempts extending up to level 1 comprise session initiation attempt failures. The session initiation attempts extending up to level 2 comprise session initiation attempt successes.

For time period E-H, four access attempt failures have occurred within a relatively short time, i.e., within the time period E-H. In this example, if the predetermined session attempts limit is four or less, and if the predetermined session fail time period is less than or equal to the time period E-H, then the four attempt failures in the time period E-H can be determined to be a failure and the UE fail state can be set to true.

Referring again to FIG. 3, in step 303 a UE connection fail state is set. The UE connection fail state indicates that past media session initiation attempts involving the UE have been problematic. The UE connection fail state indicates that future media session initiation attempts may likewise experience difficulties. The UE connection fail state indicates that media sessions involving the UE therefore should not be allowed to lapse or timeout as quickly and easily as for a UE that has not experienced such connection difficulties.

Figure 5:
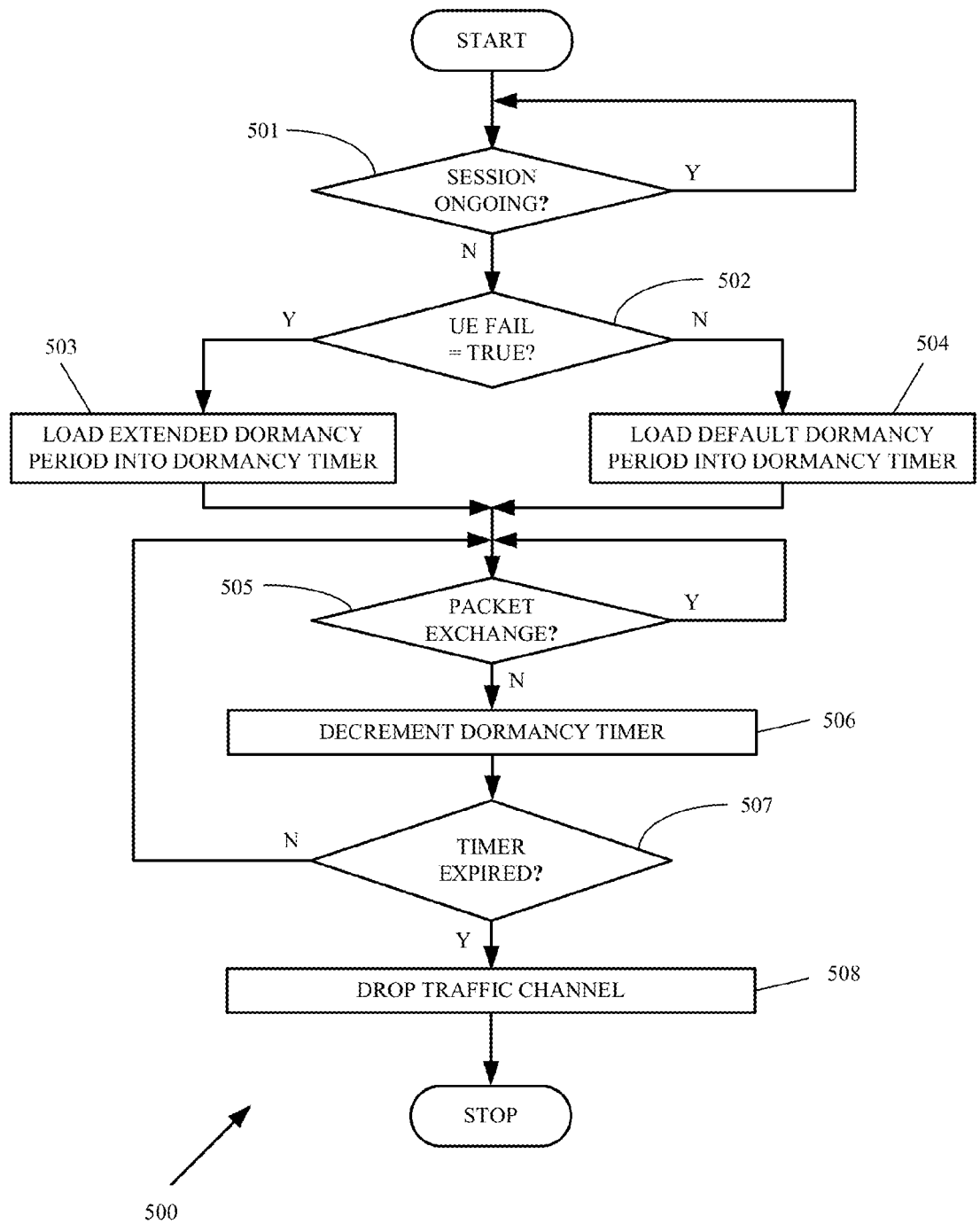
FIG. 5 is a flowchart of an exemplary media session extension method in a wireless access node of a wireless network.

FIG. 5 is a flowchart 500 of an exemplary media session extension method in a wireless access node of a wireless network. In step 501, if the media session is ongoing, the method loops back and waits. The media session can be determined to be ongoing if packets continue to be exchanged between the wireless access node and a UE. Otherwise, where packets are no longer being exchanged and the session is no longer ongoing, the method proceeds to step 502.

In step 502, if the UE fail state is true, then the method branches to step 503. The UE fail state will be set to true if the UE has had connection difficulties in the past. Otherwise, where the UE fail state is not true, the method branches to step 504.

In step 503, where the UE fail state is true, an extended dormancy time period is loaded into a dormancy timer. The extended dormancy time period comprises an extended time period to wait for a packet exchange. The extended dormancy time period will be larger or longer than a default dormancy time period. The extended dormancy time period extends a media session duration in the event that the UE has had connection difficulties in the past.

In step 504, where the UE fail state was not true, a default (i.e., normal) dormancy time period is loaded into the dormancy timer. The default dormancy time period comprises a dormancy time period that is used when the UE fail state is not true, i.e., the UE has not suffered connection difficulties within a previous time period.

In step 505, the method checks to see if a packet exchange has recently occurred. If a packet exchange has occurred within a predetermined time period from a last check for a packet exchange, then the method loops back up and waits. Otherwise, where a packet exchange has not occurred, the method proceeds to step 506.

In step 506, the dormancy timer is decremented. The dormancy timer is decremented in time spans between packet exchanges, wherein the dormancy timer is periodically decremented as long as no new packet exchange occurs.

In step 507, the dormancy timer is checked to see if it has expired. If the dormancy timer has not expired, the method loops back to step 505, wherein the dormancy timer may be decremented again if a packet exchange has not recently occurred. Otherwise, if the dormancy timer has expired, the method branches to step 508.

In step 508, where the dormancy timer has expired, one or both of the signaling channel and the traffic channel are maintained by the wireless access node. For example, the signaling channel may be maintained between the wireless access node and the UE so that the media session can be more quickly and easily established. Alternatively, where the traffic level information includes both signaling channel traffic information and traffic channel traffic information, the signaling channel can be maintained or dropped based on the signaling channel traffic information and the traffic channel can be maintained or dropped based on the traffic channel traffic information.

In some examples, one or both of the signaling channel and the traffic channel are maintained for as long as the UE is present and registered to the wireless access node. Alternatively, in other examples the wireless access node can include another, longer timer (not shown) that can be used to terminate the signaling channel and the traffic channel at some later time.

As an alternative to maintaining one or both of the traffic channel and the signaling channel, in other examples the wireless access node will drop at least one of the traffic channel and the signaling channel or will drop the traffic channel while maintaining the signaling channel, for example. In addition, after the dormancy timer expiration the wireless access node can store and maintain the UE information. The UE information comprises information that can be used by the wireless access node to more quickly re-establish a media session with the UE at a later time.

Figure 6:
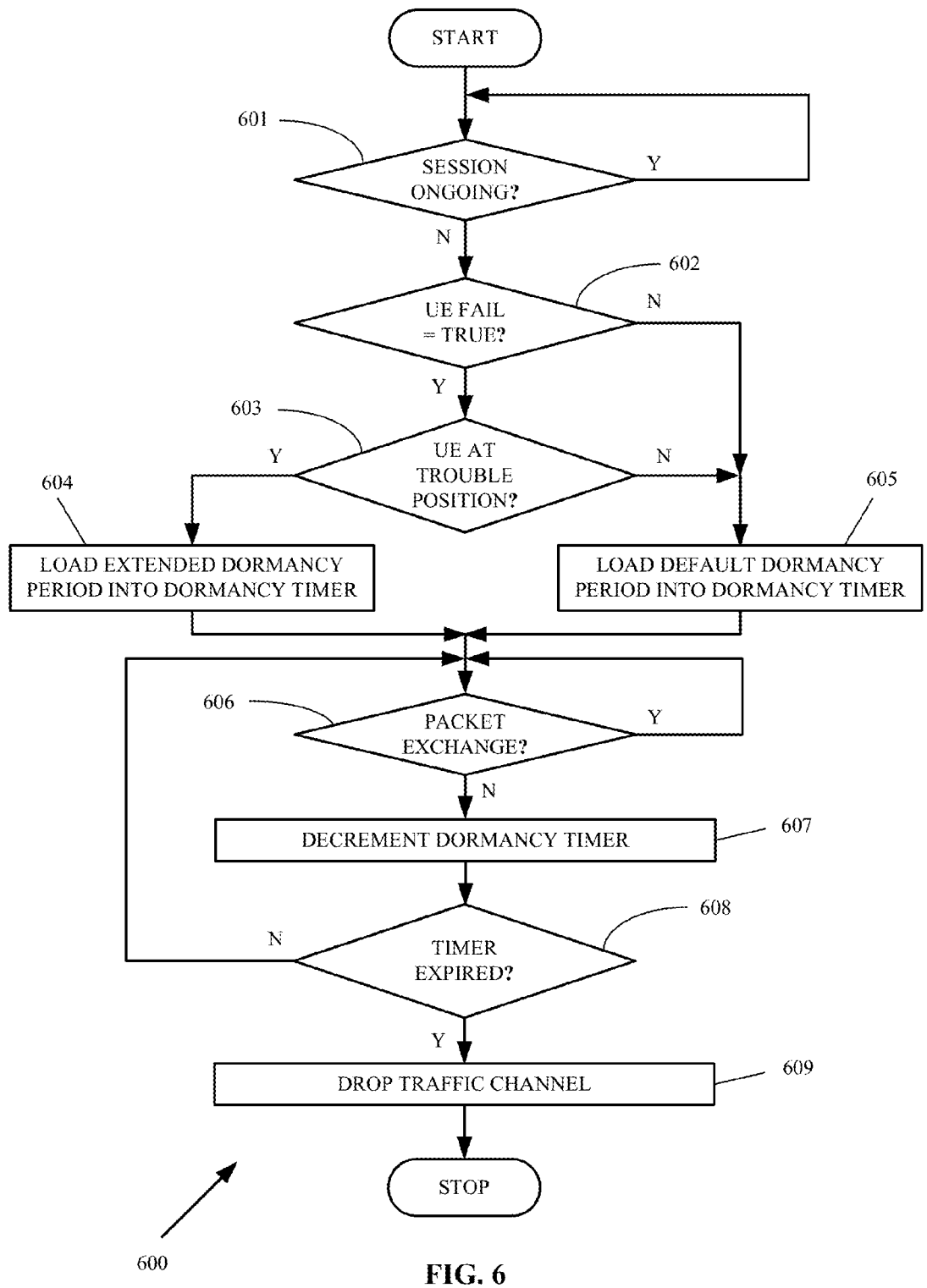
FIG. 6 is a flowchart of another exemplary media session extension method in a wireless access node of a wireless network.

FIG. 6 is a flowchart 600 of another exemplary media session extension method in a wireless access node of a wireless network. In step 601, if the media session is ongoing, the method loops back and waits, as previously discussed. Otherwise, where packets are no longer being exchanged and the session is no longer ongoing, the method proceeds to step 602.

In step 602, if the UE fail state is true, then the method branches to step 603, as previously discussed. Otherwise, where the UE fail state is not true, the method branches to step 605.

In step 603, if the UE is currently at a trouble position, then the method branches to step 604. Otherwise, if the UE is not currently at a trouble position, the method branches to step 605. The trouble position in some examples comprises the UE current location being at within the UE top two locations for the UE. The UE top two locations comprise the two geographic locations where the UE is most likely to be found. As a result, the UE will receive a media session extension only when the UE is currently at a geographic location as given in the UE top two locations information.

In step 604, where the UE fail state is true and the UE current location is within the UE top two locations, an extended dormancy time period is loaded into a dormancy timer, as previously discussed.

In step 605, where the UE fail state was not true or the UE current location is not within the UE top two locations, a default (i.e., normal) dormancy time period is loaded into the dormancy timer, as previously discussed.

In step 606, the method checks to see if a packet exchange has recently occurred, as previously discussed. If a packet exchange has occurred within a predetermined time period from a last check for a packet exchange, then the method lops back up and waits. Otherwise, where a packet exchange has not occurred, the method proceeds to step 607.

In step 607, the dormancy timer is decremented, as previously discussed.

In step 608, the dormancy timer is checked to see if it has expired, as previously discussed. If the dormancy timer has not expired, the method loops back to step 606, wherein the dormancy timer may be decremented again if a packet exchange has not recently occurred. Otherwise, if the dormancy timer has expired, the method branches to step 609.

In step 609, where the dormancy timer has expired, one or both of the signaling channel and the traffic channel are maintained by the wireless access node. For example, the signaling channel may be maintained between the wireless access node and the UE so that the media session can be more quickly and easily established. Alternatively, where the traffic level information includes both signaling channel traffic information and traffic channel traffic information, the signaling channel can be maintained or dropped based on the signaling channel traffic information and the traffic channel can be maintained or dropped based on the traffic channel traffic information.

In some examples, one or both of the signaling channel and the traffic channel are maintained for as long as the UE is present and registered to the wireless access node. Alternatively, in other examples the wireless access node can include another, longer timer (not shown) that can be used to terminate the signaling channel and the traffic channel at some later time.

As an alternative to maintaining one or both of the traffic channel and the signaling channel, in other examples the wireless access node will drop at least one of the traffic channel and the signaling channel or will drop the traffic channel while maintaining the signaling channel, for example. In addition, after the dormancy timer expiration the wireless access node can store and maintain the UE information. The UE information comprises information that can be used by the wireless access node to more quickly re-establish a media session with the UE at a later time.

The wireless network 100 and the wireless access node 200 can provide communication services including voice calls, text messages, data access, or other communication services provided over cellular or wireless communication networks. In some examples, the wireless network 100 and the wireless access node 200 include equipment to provide wireless access within different coverage areas, to route communications between content providers and user devices, and to facilitate handoffs between UEs within different coverage areas, among other operations.

The wireless network 100 in some examples comprises a Radio Access Network (RAN). However, other wireless communication networks are contemplated and are within the scope of the description and claims. Alternatively, the wireless network 100 may comprise a communication network including a combination of wired and wireless communication components and communication links.

Wireless communication protocols that may be utilized by the wireless network 100 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or some other wireless network protocol. However, it should be understood that this listing is not exhaustive, and other wireless communication protocols are contemplated and within the scope of the description and claims.

The wireless link can use air or space as the transport media. The wireless link can comprise a wireless communication link provided over an associated wireless frequency spectrum or wireless frequency band, and can use various wireless communication protocols, including cellular telephone communication protocols.

The wireless access node 200 may communicate with the UE 104 using a variety of frequencies and a variety of communication schemes. The wireless access node 200 can provide multiple sectors of wireless coverage. It should be understood that any number of wireless access nodes 200 can be included in the wireless network 100.

The wireless access node 200 comprise RF communication and control circuitry, transceivers, and antennas, as well as wireless communications equipment capable of communicating with and providing wireless access within a wireless coverage area to communication services for wireless communication devices, such as the UE 104. The RF communication circuitry typically includes amplifiers, filters, RF modulators, transceivers, and signal processing circuitry. The wireless access node 200 may include processing equipment, routing equipment, and physical structures. The wireless access node 200 may include transceiver and antenna equipment for exchanging wireless communications with one or more UEs 104 in a sector of wireless coverage. Further equipment, networks, and/or systems can be communicatively coupled to the wireless access node 200, such as wire networks and systems, for example (not shown for clarity). It should be understood that the wireless access node 200 can be distributed or consolidated among equipment or circuitry that together forms the elements of the wireless access node 200. The the wireless access node 200 can optionally include additional devices, features, or functionality not discussed herein for the purpose of brevity.

The UE 104 may be a mobile device, including a cellular phone, but also may include other devices. The UE 104 may include one or more transceiver portions for communication over one or more wireless links of differing frequency bands. The UE 104 can receive wireless access information from one or more wireless access nodes 200, such as beacon signals, channel information, frequency information, overhead signaling, neighbor lists, and the like. The UE 104 can move among any of the coverage areas associated with the wireless network 100 and the wireless access node 200 and receive wireless access.

The UE 104 can include one or more antennas, transceiver circuitry elements, and communication elements. The transceiver circuitry typically includes amplifiers, filters, modulators, and signal processing circuitry. The UE 104 can also include user interface systems, memory devices, non-transitory computer-readable storage mediums, software, processing circuitry, or some other communication components. The UE 104 can comprise subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

The processing system 220 of the wireless access node 200 can comprise one or more microprocessors and other circuitry that retrieves and executes the media session extension routine 231 from the storage system 230. The processing system 220 can be implemented within a single processing device but can also be distributed across multiple processing devices or sub-systems that cooperate in executing program instructions. Examples of the processing system 220 include general purpose central processing units, application specific processors, and logic devices, as well as any other type of processing device, combinations, or variations thereof.

The storage system 230 of the wireless access node 200 can comprise any computer readable storage media readable by the processing system 220 and capable of storing the media session extension routine 231. The storage system 230 can include volatile and nonvolatile, removable and non-removable media implemented in any method or technology for storage of information, such as computer readable instructions, data structures, program modules, or other data.

In addition to storage media, in some implementations the storage system 230 can also include communication media over which the media session extension routine 231 can be communicated. The storage system 230 can be implemented as a single storage device but can also be implemented across multiple storage devices or sub-systems co-located or distributed relative to each other. The storage system 230 can comprise additional elements, such as a controller, capable of communicating with the processing system 220. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The media session extension routine 231 of the wireless access node 200 can include additional processes, programs, or components, such as operating system software, database software, or application software. The media session extension routine 231 can also comprise firmware or some other form of machine-readable processing instructions executable by the processing system 220. In at least one implementation, the program instructions can include first program instructions that direct the processing system 220 to exchange communications with one or more UEs 104 and with the wireless network 100, among other operations.

In general, the media session extension routine 231 can, when loaded into the processing system 220 and executed, transform the processing system 220 into a special-purpose computing system configured to exchange communications with the UE 104, among other operations. Encoding the media session extension routine 231 on the storage system 230 can transform the physical structure of the storage system 230. The specific transformation of the physical structure can depend on various factors in different implementations of this description. Examples of such factors can include, but are not limited to the technology used to implement the storage media of the storage system 230 and whether the computer-storage media are characterized as primary or secondary storage. For example, if the computer-storage media are implemented as semiconductor-based memory, the media session extension routine 231 can transform the physical state of the semiconductor memory when the program is encoded therein. For example, the media session extension routine 231 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A wireless access node configured to extend a media session in a wireless network, comprising:
   a communication interface exchanges wireless communications with a user equipment (UE);
   a storage system stores a UE fail state corresponding to the UE of a current media session and store an extended dormancy time period;
   a processing system coupled to the communication interface and to the storage system, with the processing system determines if a media session initiation is completed,
   if the media session initiation is completed, then the processing system compares a number of failed attempts to a predetermined session attempts limit and compare an elapsed time of the failed attempts to a predetermined session fail time period,
   if the number of failed attempts exceeds the predetermined session attempts limit and if the elapsed time of the failed attempts is less than the predetermined session fail time period, then the processing system sets the UE fail state to true obtain the UE fail state,
   if the UE fail state is true, then the processing system loads the extended dormancy time period into a dormancy timer corresponding to the UE, and if the dormancy timer expires, then the processing system maintains one or both of a traffic channel and a signaling channel between the wireless access node and the UE wherein the signaling channel exchanges signals with the wireless network to establish a connection and the traffic channel exchanges communications with the wireless network for the media session.

2. The wireless access node of claim 1, with the processing system further, if the dormancy timer expires, drops at least one of a traffic channel and a signaling channel between the wireless access node and the UE.

3. The wireless access node of claim 1, with the processing system further, if the dormancy timer expires, drops a traffic channel between the wireless access node and the UE while maintaining a signaling channel between the wireless access node and the UE.

4. The wireless access node of claim 1, with the processing system further loads a default dormancy time period into the dormancy timer if the UE fail state is not true.

5. The wireless access node of claim 1, with the storage system further stores a traffic level and a traffic level threshold and with the processing system further compares the traffic level to the traffic level threshold, maintain one or both of the signaling channel and the traffic channel if the traffic level does not exceed the traffic level threshold, and drop one or both of the signaling channel and the traffic channel if the traffic level exceeds the traffic level threshold.

6. The wireless access node of claim 1, with the processing system further compares a UE current location to a UE top two locations, if the UE fail state is true and if the UE current location is within the UE top two locations, then load the extended dormancy time period into the dormancy timer, and load a default dormancy time period into the dormancy timer if the UE fail state is not true or if the UE current location is not within the UE top two locations.

7. A media session extension method in a wireless access node of a wireless network, comprising:
   in the wireless access node, determining if a media session initiation is completed, and if the media session initiation is completed, then comparing a number of failed attempts to a predetermined session attempts limit and comparing an elapsed time of the failed attempts to a predetermined session fail time period;
   in the wireless access node, if the number of failed attempts exceeds the predetermined session attempts limit and if the elapsed time of the failed attempts is less than the predetermined session fail time period, then setting a User Equipment (UE) fail state corresponding to the UE of a current media session to true;
   in the wireless access node, if the UE fail state is true, then loading an extended dormancy time period into a dormancy timer corresponding to the UE; and
   in the wireless access node, if the dormancy timer expires, then maintaining one or both of a traffic channel and a signaling channel between the wireless access node and the UE wherein the signaling channel exchanges signals with the wireless network to establish a connection and the traffic channel exchanges communications with the wireless network for the media session.

8. The media session extension method of claim 7, further comprising, in the wireless access node, if the dormancy timer expires, dropping at least one of a traffic channel and a signaling channel between the wireless access node and the UE.

9. The media session extension method of claim 7, further comprising, in the wireless access node, if the dormancy timer expires, dropping a traffic channel between the wireless access node and the UE while maintaining a signaling channel between the wireless access node and the UE.

10. The media session extension method of claim 7, further comprising, in the wireless access node, loading a default dormancy time period into the dormancy timer if the UE fail state is not true.

11. The media session extension method of claim 7, further comprising:

in the wireless access node, comparing the traffic level to the traffic level threshold;

in the wireless access node, maintaining one or both of the signaling channel and the traffic channel if the traffic level does not exceed the traffic level threshold; and in the wireless access node, dropping one or both of the signaling channel and the traffic channel if the traffic level exceeds the traffic level threshold.

12. The media session extension method of claim 7, further comprising:

in the wireless access node, comparing a UE current location to a UE top two locations;

in the wireless access node, if the UE fail state is true and if the UE current location is within the UE top two locations, loading the extended dormancy time period into the dormancy timer; and in the wireless access node, if the UE fail state is not true or if the UE current location is not within the UE top two locations, loading a default dormancy time period into the dormancy timer.

13. A media session extension method in a wireless access node of a wireless network, comprising:

in the wireless access node, determining if a media session initiation is completed, and if the media session initiation is completed, then comparing a number of failed attempts to a predetermined session attempts limit and comparing an elapsed time of the failed attempts to a predetermined session fail time period;

in the wireless access node, if the number of failed attempts exceeds the predetermined session attempts limit and if the elapsed time of the failed attempts is less than the predetermined session fail time period, then setting a User Equipment (UE) fail state corresponding to a UE of a current media session to true;

in the wireless access node, if the UE fail state is true and if the UE is within a UE top two locations, then loading an extended dormancy time period into a dormancy timer corresponding to the UE; and in the wireless access node, if the dormancy timer expires, then maintaining one or both of a traffic channel and a signaling channel between the wireless access node and the UE wherein the signaling channel exchanges signals with the wireless network to establish a connection and the traffic channel exchanges communications with the wireless network for the media session.

14. The media session extension method of claim 13, further comprising, in the wireless access node, if the dormancy timer expires, dropping at least one of a traffic channel and a signaling channel between the wireless access node and the UE.

15. The media session extension method of claim 13, further comprising, in the wireless access node, if the dormancy timer expires, dropping a traffic channel between the wireless access node and the UE while maintaining a signaling channel between the wireless access node and the UE.

16. The media session extension method of claim 13, further comprising, in the wireless access node, loading a default dormancy time period into the dormancy timer if the UE fail state is not true or if the UE current location is not within the UE top two locations.

17. The media session extension method of claim 13, further comprising:

in the wireless access node, comparing the traffic level to the traffic level threshold;

in the wireless access node, maintaining one or both of the signaling channel and the traffic channel if the traffic level does not exceed the traffic level threshold; and in the wireless access node, dropping one or both of the signaling channel and the traffic channel if the traffic level exceeds the traffic level threshold.

* * * * *